2,920,601

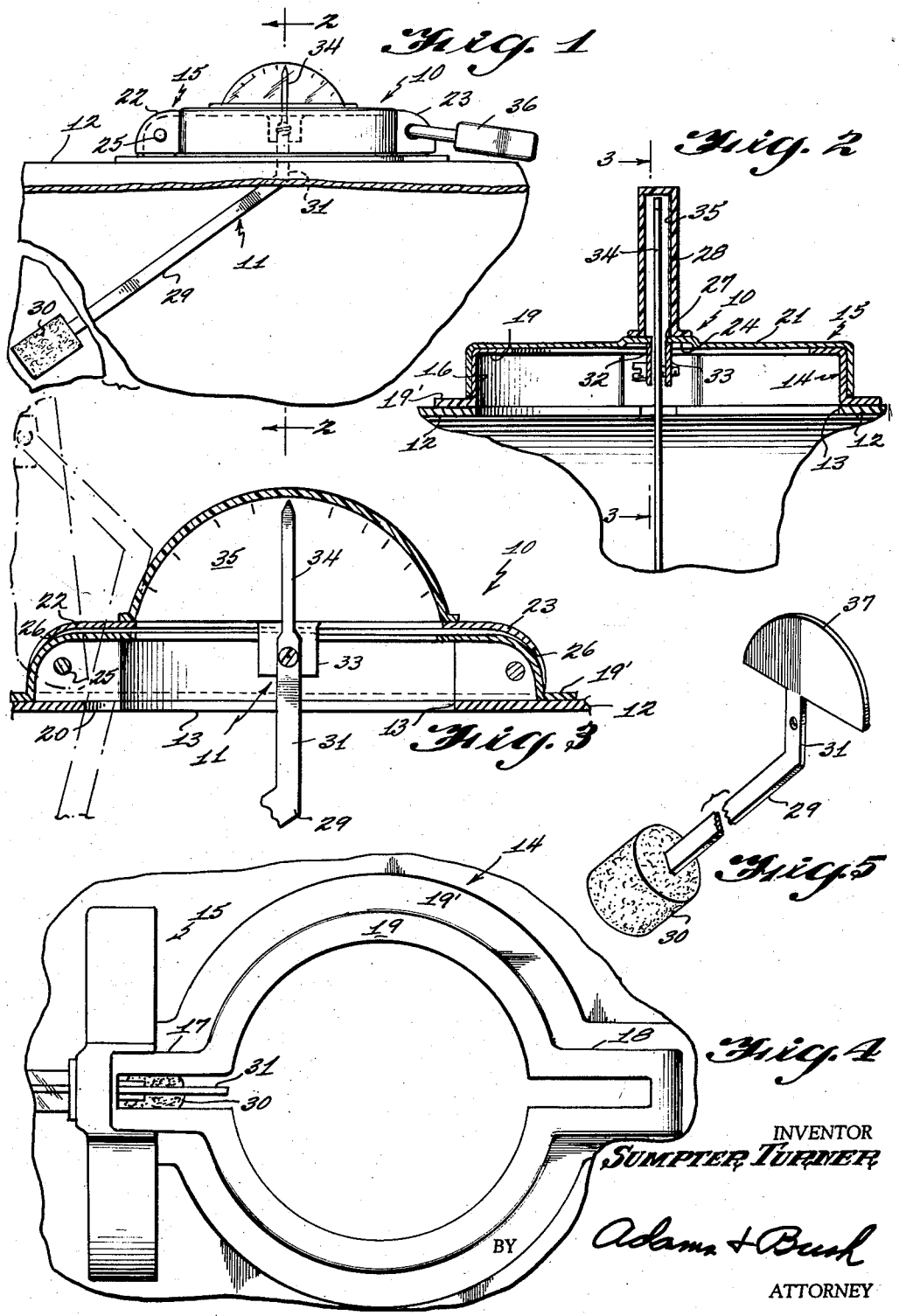

FILLER AND LIQUID LEVEL INDICATOR FOR TANKS

Sumpter Turner, Goldsboro, N.C.

Application August 20, 1958, Serial No. 756,147

5 Claims. (Cl. 116—118)

This invention relates to devices for indicating the level of liquids in tanks and the like and has more particular reference to a combination filler and liquid level indicator for such tanks.

One object of the present invention is to provide a novel and improved combination filler and liquid level indicator for a liquid containing tank such as a fuel oil tank with the liquid level indicator so constructed and arranged as to be readily assembled and visible at all times at a convenient distance from the tank.

Another object of the present invention is to provide a novel and improved filler and liquid level indicator for a tank, as characterized above, in which the liquid level device is mounted so as not to interfere with the ingress of liquid when the tank is being filled.

Another object of the present invention is to provide a filler and liquid level indicator, as characterized above, which is simple in construction and efficient in operation.

A further object of the invention is to provide a filler and liquid level indicator, as characterized above, which may be readily and easily installed upon a tank which is already in place.

Other objects and advantages of the invention will appear in the following specification when considered in connection with the accompanying drawings, wherein:

Fig. 1 is a front elevational view of a filler and liquid level indicator constructed in accordance with the present invention, a portion of the tank upon which it is mounted being shown in section;

Fig. 2 is a sectional view taken on the line 2—2 of Fig. 1;

Fig. 3 is a sectional view taken on the line 3—3 of Fig. 2;

Fig. 4 is a plan view, on an enlarged scale, of the device shown in Fig. 3, but showing the cap member of the filler raised to permit filling the tank on which the device is mounted; and Fig. 5 is a perspective view, with parts broken away, showing a modified form of indicator for use with the device of the invention.

The present invention provides a novel and improved filler and liquid level indicating device for tanks, such as fuel oil tanks, and, in general, the device comprises a cap assembly mounted to cover the filling opening in the tank and having a liquid level indicating device depending therefrom and extending down into the tank through the filling opening therein, the construction and arrangement being such that when the cap member is raised to uncover the filling opening in the tank, the liquid level indicating device, hingedly connected to the cap member, will be swung to one side to avoid interfering with the free ingress of liquid into the tank through the filling opening.

The invention further contemplates that the cap member be provided with a slotted opening covered by a transparent housing member into which an indicating member, carried by the liquid level indicating device, projects so that the actual liquid level in the tank will be indicated by the indicating member and be visible when the cap member is in closed position.

Referring now to the drawings, there is illustrated, in Figs. 1 to 4, inclusive, one embodiment of a filler and liquid level indicating device constructed in accordance with the present invention.

As there shown, the device comprises a filler assembly, indicated generally at 10, and a liquid level indicator, indicated generally at 11, pivotally carried by the filler assembly and projecting down into a tank 12 on which the device is mounted.

The tank 12 may be of any usual commercial type and is shown as being provided with a generally circular filling opening 13 in its top wall and on which is mounted the filler assembly 10.

The filler assembly 10 is shown as made up of two parts, a base member or collar 14 and a cap or cover member 15 hingedly connected to the base member at one side. In the particular embodiment of the invention illustrated, the base member 14 is shown as comprising an open ended sleeve or collar 16 with opposed laterally extending slotted ears 17, 18, the side walls of the sleeve and the ears having flanges 19, 19' formed at their top and bottom edges, respectively, and projecting laterally therefrom in opposite directions.

The base member 14 is secured to the tank 11 and around the filling opening 13 as by welding or riveting the lower flange 19' to the tank. The filling opening 13 is provided with a slot 20 positioned to correspond to the slot in the ear 17 of the collar for a purpose hereinafter to be described.

The cap or cover member 15 is generally similar in outline to the base member 14 and is shown as comprising a hollow generally cup-shaped member 21 having laterally projecting opposed hollow ears 22, 23. An inwardly opening slot 24 is formed in the cap member and extends into the slots formed in the hollow ears 22, 23.

The cover member 15 is of a size and shape to fit snugly over the base member 14 and is adapted to have one of its ears (22) hingedly connected to one of the ears (17) of the base member, as by means of a hinge pin 25 extending through side walls of both ears. The top walls of the ears 22 and 23 of the cover member are cut away, as indicated at 26, to permit the cover member 15 to be raised to an upright position about its hinge. The cover member 15 is also provided with an elongated slot 27 in its top portion, and a transparent housing 28 is secured over the slot, all for a purpose to be hereinafter described.

The liquid level indicator 11 is shown as comprising an elongated lever 29 having a float member 30 secured to one end and having its upper end 31 bent upwardly at an angle of about 22½° from the longitudinal axis of the lever, and is pivotally mounted between a pair of depending lugs 32, 33 secured to the edges of the slot 27 formed in the cover member, with its upper end forming an indicator pointer 34, which is adapted to be used in connection with a semi-circular scale 35 secured against one internal side wall of the transparent housing 28 (see Figs. 2 and 3).

The operation of the apparatus is believed apparent. Normally, the cover member is mounted in place over the base member 14 and is usually secured thereto by suitable means such as a padlock 36, as shown in Fig. 1. In this position, the pointer 34 of the indicating device, in cooperation with the scale 35, will indicate the amount of oil present in the tank and, as the pointer and scale are mounted in a transparent housing, this can readily be ascertained without raising the cover member.

When the liquid level indicator shows that the tank requires refilling, the cover member 15 is unlocked and swung upwardly about its pivot to substantially a 90° angle, as shown in Figs. 2 and 4, to permit the filling hose to be inserted into the collar member 14 for filling the tank. As the cover member is swung upwardly, the liquid level indicator will move to the left, as shown in Figs. 1, 2 and 3, so as to avoid interference with the nozzle of the filling hose projecting through the collar member 14 to fill the tank, as best seen in Figs. 3 and 4.

The elongated lever 29 will be swung to the left into the slots formed in the ears of the collar member and the cover member, as shown in Figs. 3 and 4, thus moving the liquid level indicator to one side to avoid interference with the proper filling of the tank.

In some instances, it is desirable to substitute for the pointer 34 and the scale 35, a different form of indicator pointer which merely shows, by the use of two colors, such as red and green, the condition of the tank with respect to the liquid contents therein. Such a device is shown in Fig. 5, wherein a semi-circular disc 37 has been substituted for the pointer 34 employed in the modification shown in Fig. 3. The semi-circular disc 37 is formed integral with the upper end 31 of the lever 29 and may be painted in contrasting colors, which will be visible through the transparent housing 28 when the disc is mounted in the housing. This indicating device operates in the same manner as the indicating device illustrated in Figs. 1 to 4, inclusive.

From the foregoing, it readily will be seen that there has been provided a novel and improved filler and liquid level indicating device for a tank; a device which is simple in construction and extremely efficient in operation and which may readily be applied to existing tanks; a device which clearly indicates the amount of liquid in the tank by visible inspection; and one which permits the tank to be filled without the liquid level indicator interfering with the filling operation.

Obviously the invention is not restricted to the particular embodiment thereof herein shown and described.

What is claimed is:

1. A filler and liquid level indicator for use on tanks having a filling opening therein for the ingress of liquid comprising an open-ended tubular base member having a filling passageway therethrough and adapted to be secured on the tank over the filling opening; a closure member for said base member hingedly connected thereto adjacent one end and having a slot covered by a housing formed in its top wall; and means for indicating the level of the liquid in said tank including an elongated lever hingedly connected to said cover member and projecting downwardly through said base member into said tank, said lever having a float member secured on its lower end and having its upper end portion bent upwardly and extending into said housing to form an indicating device; and means permitting said indicating device to be seen when said cover member is in closed position over said base member including transparent walls formed in said housing, the construction and arrangement being such that when said cover member is raised to permit filling said tank, said indicating means will be moved to one side so as not to interfere with the filling process.

2. Apparatus as set forth in claim 1, wherein said base member has a vertically slotted ear on one side and said cover member has an inwardly opening slotted ear on one side pivotally mounted on the slotted ear of said base member, whereby when said cover member is raised to permit filling the tank said elongated lever will be moved to one side and received in the slots in the ears on the cover member and base member, thereby avoiding interference with the filling apparatus.

3. Apparatus as set forth in claim 1, wherein said upper end portion of said elongated lever extends upwardly at an angle of about 22½° from the longitudinal axis of said lever and is pivotally connected to a lug depending from the under side of said cover member with the end of the indicating device projecting through said slot in the top wall of said cover member.

4. Apparatus as set forth in claim 1, wherein a scale is formed on one side wall of said housing and said indicating device is in the form of a pointer for use with said scale.

5. Apparatus as set forth in claim 1, wherein said indicating device is in the form of a semi-circular plate mounted in said housing and having areas painted in contrasting colors to indicate the state of the liquid level in said tank.

References Cited in the file of this patent
UNITED STATES PATENTS

| | | |
|---|---|---|
| 1,725,027 | Tampier | Aug. 20, 1929 |
| 1,751,016 | O'Neil | Mar. 18, 1930 |
| 2,744,411 | Spencer | May 8, 1956 |